United States Patent [19]

Funaki

[11] Patent Number: 4,657,819
[45] Date of Patent: Apr. 14, 1987

[54] FLEXIBLE MAGNETIC RECORDING MEDIUM COMPRISING AN UNDERLYING FILM HAVING REDUCED IN-PLANE MAGNETIC ANISOTROPY UNDER A SURFACE FILM HAVING PERPENDICULAR MAGNETIC ANISOTROPY

[75] Inventor: Hidefumi Funaki, Tokyo, Japan

[73] Assignee: Anelva Corporation, Japan

[21] Appl. No.: 710,923

[22] Filed: Mar. 12, 1985

[30] Foreign Application Priority Data

Mar. 13, 1984 [JP] Japan .................................. 59-47882

[51] Int. Cl.$^4$ .................................................. G11B 7/24
[52] U.S. Cl. .................................... 428/458; 360/131; 428/611; 428/694; 428/900; 428/928
[58] Field of Search .............. 428/694, 900, 458, 611, 428/928; 360/131

[56] References Cited

U.S. PATENT DOCUMENTS

| | | | |
|---|---|---|---|
| 4,210,946 | 7/1980 | Iwasaki et al. | 428/900 |
| 4,232,071 | 11/1980 | Terada et al. | 428/694 |
| 4,277,809 | 7/1981 | Fisher et al. | 427/131 |
| 4,351,010 | 9/1982 | Argi | 428/694 |
| 4,410,603 | 10/1983 | Yamamori et al. | 428/900 |
| 4,548,682 | 10/1985 | Yoshida et al. | 204/35.1 |
| 4,576,876 | 3/1986 | Shiiki et al. | 360/131 |

FOREIGN PATENT DOCUMENTS 208631 12/1982 Japan .................................. 428/694

Primary Examiner—George F. Lesmes
Assistant Examiner—William M. Atkinson
Attorney, Agent, or Firm—Laff, Whitesel, Conte & Saret

[57] ABSTRACT

In a flexible magnetic recording medium comprising first and second films (11) and (12) successively formed on a substrate (10), the first film comprises an alloy of nickel and iron together with a magnetization adjusting component. An amount of the magnetization adjusting component is adjusted so that the first film has saturation magnetization less than or equal to 500 e.m.u./cc. The magnetization adjusting component may be either molybdenum or a combination of molybdenum and copper. The magnetization adjusting component may be between 12 and 50% by weight in the first film. Alternatively, the magnetization adjusting component may be titanium or silicon. The alloy may be Permalloy. The substrate may be a polyester film.

5 Claims, 8 Drawing Figures

FLEXIBLE MAGNETIC RECORDING MEDIUM COMPRISING AN UNDERLYING FILM HAVING REDUCED IN-PLANE MAGNETIC ANISOTROPY UNDER A SURFACE FILM HAVING PERPENDICULAR MAGNETIC ANISOTROPY

BACKGROUND OF THE INVENTION

This invention relates to a flexible magnetic recording medium for use in perpendicular magnetic recording and, more particularly, to a flexible magnetic recording medium which comprises an underlying film having in-plane magnetic anisotropy under a surface film having perpendicular magnetic anisotropy.

A conventional flexible magnetic recording medium of the type described comprises a substrate, such as a polyester film, which has a principal surface. A first film is formed on the principal surface as an underlying film. A second film is formed on the first film as a surface film. The second film has magnetic anisotropy perpendicular to the principal surface, that is, an axes of easy magnetization perpendicular to the second film. For brevity of description such magnetic anisotropy will be called "perpendicular magnetic anisotropy". The second film is magnetizable perpendicular to the principal surface.

On the other hand, the first film is of an alloy having high magnetic permeability. The first film has magnetic anisotropy parallel to the principal surface, that is, both axes of easy magnetization and axes of hard magnetization are parallel to the principal surface. For brevity of description, such magnetic anisotropy will be called "in-plane magnetic anisotropy". As is well known in the art, the first film is operable as a part of a magnetic head on perpendicularly recording a digital signal into the second film and on reading the digital signal out of the second film.

In the flexible magnetic recording medium, the first film is of a composition of nickel, iron, and molybdenum, known as "Permalloy". Otherwise, the first film is of another composition of nickel, iron, molybdenum, and copper known also as "Permalloy". In general, the first film of the Permalloy having the above-mentioned composition is continuously formed on the substrate while the substrate is fed lengthwise through a sputtering device. The first film formed on the substrate in the above-mentioned manner has the in-plane magnetic anisotropy with axes of hard magnetization directed lengthwise of the substrate and with axes of easy magnetization directed widthwise of the substrate. The conventional first film has saturation magnetization which is equal to or greater than 550 e.m.u./cc.

A flexible disk is cut from a wide flexible magnetic medium of the type described above. Such a flexible disk is well known in the art as a "floppy disk". Let a signal having a constant voltage amplitude be recorded into the flexible disk. As will later be described in conjunction with a few figures of the accompanying drawing, a voltage amplitude of a reproduced signal read out of the disk varies during one complete revolution of the disk so that a maximum voltage amplitude and a minimum voltage amplitude of the reproduced signal appear twice each. This is because the in-plane magnetic anisotropy of the first film is too large because there is a too large saturation magnetization of the first film. Thus, the first film has so large an in-plane magnetic anisotropy that it is not possible to accurately record digital information by the use of the flexible disk.

SUMMARY OF THE INVENTION

It is therefore an object of this invention to provide a perpendicular magnetic recording medium which comprises an underlying film having reduced in-plane magnetic anisotropy under a surface film.

It is another object of this invention to provide a perpendicular magnetic recording medium of the type described which is suitable for a flexible disk in which accurate record of digital information can be achieved.

A magnetic recording medium to which this invention is applicable comprises a substrate having a principal surface, a first film formed on the principal surface, and a second film which is formed on the first film and which has magnetic anisotropy perpendicular to the principal surface so that the second film is magnetizable perpendicular to the principal surface. The first film comprises an alloy of nickel and iron and having high magnetic permeability. The first film has magnetic anisotropy parallel to said principal surface. According to this invention, the first film further comprises a magnetization adjusting component besides the alloy so that the first film has saturation magnetization less than or equal to 500 e.m.u./cc.

DESCRIPTION OF THE PREFERRED EMBODIMENTS

Figure 1:
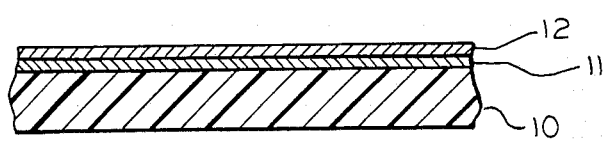
FIG. 1 is a partial sectional view of a flexible magnetic recording medium to which this invention is applicable.

Referring to FIG. 1, a flexible magnetic recording medium to which this invention is applicable is for use in perpendicular magnetic recording. The flexible magnetic recording medium comprises a substrate 10 of a nonmagnetic material which has a principal surface. The substrate 10 may be a polyester film having a thickness between 10 microns and 75 microns.

A first film 11 is formed on the principal surface as an underlying film. A second film 12 is formed on the first film 11 as a surface film. The first film 11 may have a thickness between 0.3 micron and 1.0 micron while the second film 12 may have a thickness between 0.1 micron and 0.5 micron.

The second film 12 has perpendicular magnetic anisotropy so that the second film 12 is magnetizable perpendicular to the principal surface. This means that the second film 12 has axes of easy magnetization perpendicular to the principal surface. The second film 12 is, for example, a film of a composition of cobalt and chromium and is formed by sputtering. The second film 12 can be formed by various other compositions and in a wide variety of manners known in the art.

The first film 11 is of an alloy, such as Permalloy, having high magnetic permeability. The first film 11 has in-plane anisotropy. That is to say, both axes of easy magnetization and axes of hard magnetization are parallel to the principal surface. It is well known in the art that the first film 11 acts as a part of a magnetic head on perpendicularly recording a digital signal into the second film 12 and on reading the digital signal out of the second film 12.

Figure 2:
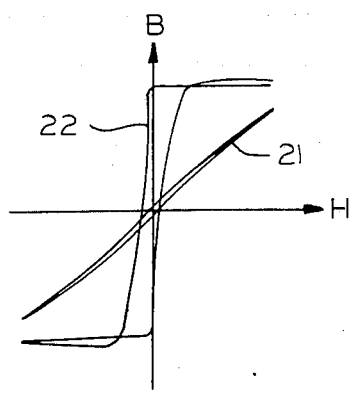
FIG. 2 shows a graph of hysteresis characteristics of an underlying film of a conventional flexible magnetic recording medium.

Referring to FIG. 2, a conventional flexible magnetic recording medium of the type described will now be described for a better understanding of this invention. In the magnetic recording medium, the first film 11 of Permalloy is formed on the substrate 10 of polyester by sputtering in a sputtering device. The Permalloy comprises 4% by weight of molybdenum and the balance which is of nickel and iron. The Permalloy is continuously formed on the substrate 10 while the substrate 10 is fed lengthwise through the sputtering device. The Permalloy has hysteresis characteristics, namely, B-H charcteristics, as shown in FIG. 2. More particularly, a first curve 21 is illustrative of the B-H characteristic of the Permalloy in a lengthwise direction of the substrate 10 and exhibits a very narrow hysteresis loop. A second curve 22 is illustrative of the B-H characteristic of the Permalloy in a widthwise direction of the substrate 10 and exhibits a rectangular hysteresis loop. From the first and the second curves 21 and 22, it is readily understood that the first film 11 has axes of hard magnetization directed lengthwise of the substrate 10 and axes of easy magnetization directed widthwise of the substrate 10.

The second film 12 is deposited in the known manner to form the flexible magnetic recording medium as illustrated in FIG. 1. The flexible magnetic recording medium is thereafter cut into a flexible disk.

Figure 3:
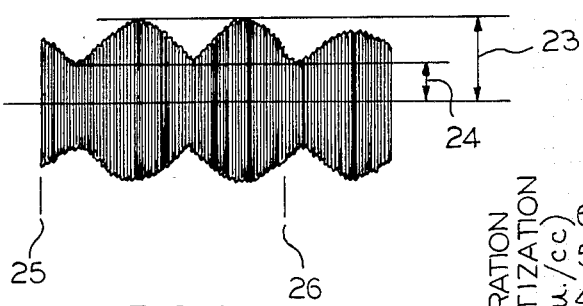
FIG. 3 shows a reproduced signal read out of a flexible disk made of the conventional flexible magnetic recording medium when a signal of a constant voltage amplitude is recorded into the flexible disk.

Referring to FIG. 3, a reproduction characteristic of the flexible disk is shown which is observed as a reproduced signal on a cathode-ray tube type oscillograph. The reproduced signal is read out of the flexible disk along a circumference. As readily understood from Fig. 3, an amplitude of the reproduced signal is variable along the circumference of the flexible disk even when a storage signal has an invariable amplitude. More specifically, a reference numeral 23 indicates a maximum voltage of the reproduced signal while another reference numeral 24 represents a minimum voltage of the reproduced signal. One complete revolution of the disk is indicated by a pair of lines 25 and 26 which may be recognized as pulses appearing at every revolution. That is to say, a portion depicted between the pulses 25 and 26 appears in the reproduced signal during one complete revolution of the disk. The maximum voltage appears twice during one complete revolution of the disk. The minimum voltage also appears twice during one complete revolution of the disk.

Each of the maximum voltages is observed when a magnetized direction of the first film 11 is coincident with a direction parallel to the axes of hard magnetization on deriving the reproduced signal by the use of the above-described magnetic head. On the contrary, each minimum voltage is observed when a magnetized direction of the first film 11 is coincident with a direction which is parallel to the axes of easy magnetization.

It has been found out that the amplitude of the reproduced signal is variable depending on in-plane magnetic anisotropy and saturation magnetization of the first film 11. In other words, the first film 11 of the conventional flexible magnetic recording medium is so large in in-plane magnetic anisotropy that accurate recording can not be achieved by the use of the flexible disk made of the flexible magnetic recording medium as described in the preamble of the instant specification.

Figure 4:
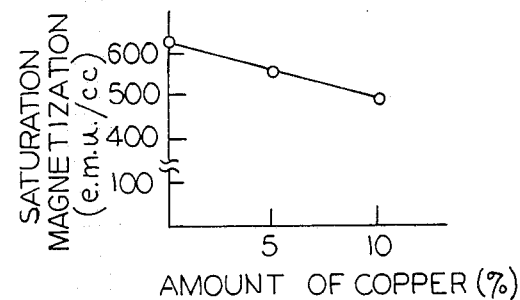
FIG. 4 shows a graph for use in describing this invention.
Figure 5:
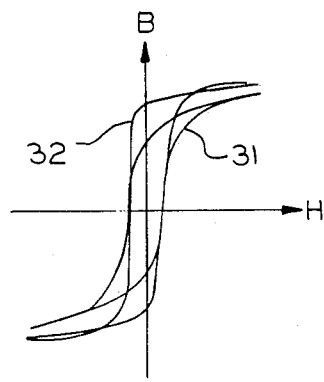
FIG. 5 shows a graph of hysteresis characteristics of an underlying film of a modified flexible magnetic recording medium.
Figure 6:
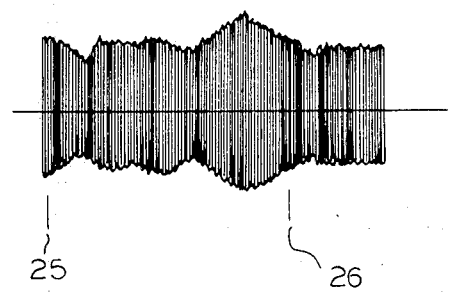
FIG. 6 shows a reproduced signal read out of a flexible disk made of the modified flexible magnetic recording medium when a signal of a constant voltage amplitude is recorded into the flexible disk.

Referring to FIGS. 4 through 6, a novel principle will be disclosed about a flexible magnetic recording medium comprising a first film 11 having reduced in-plane magnetic anisotropy. It has been found that a reduction of in-plane magnetic anisotropy is possible by reducing saturation magnetization of the first film 11 and that an addition of copper to Permalloy serves as a reduction of saturation magnetization of the first film 11. For example, let the Permalloy comprise, by weight, 79% of nickel, 17% of iron, and 4% of molybdenum. It is assumed that a composition of the first film 11 is defined by weight as $(Ni.Fe.Mo)_{100-x}.(Cu)_x$. In FIG. 4, the abscissa represents the amount of x (% by weight). On the other hand, the ordinate represents saturation magnetization of the first film 11. It is apparent from FIG. 4 that saturation magnetization decreases as the amount of copper increases.

Referring to FIGS. 5 and 6, let a modified flexible magnetic recording medium be tentatively considered. A first film 11 of the modified flexible magnetic recording medium comprises 5% by weight of copper added to the above-mentioned Permalloy. The first film 11 has saturation magnetization which is about 550 e.m.u./cc, as shown in FIG. 4.

In FIG. 5, a characteristic curve 31 is illustrative of B-H characteristic of the first film 11 in a lengthwise direction of the substrate 10 while another characteristic curve 32 is illustrative of the B-H characteristic of the first film 11 in a widthwise direction of the substrate 10. As shown in FIG. 5, both of the curves 31 and 32 form rectangular hysteresis loops. The curve 31 is similar in shape to the curve 32. Therefore, it is apparent that in-plane magnetic anisotropy of the first film 11 is smaller than that of the Permalloy shown in FIG. 2. A flexible disk is manufactured by cutting the flexible magnetic recording medium.

In FIG. 6, a reproduction characteristic of the flexible disk is observed in the manner described in conjunction with FIG. 3 by recording a signal of a constant voltage amplitude and by reading the signal as the reproduced signal out of the flexible disk. As illustrated in FIG. 6, the fluctuation of the reproduced signal can moderately be mitigated in the flexible disk. This suggests that the mitigation of fluctuation can be augmented by increasing the amount of copper.

Figure 7:
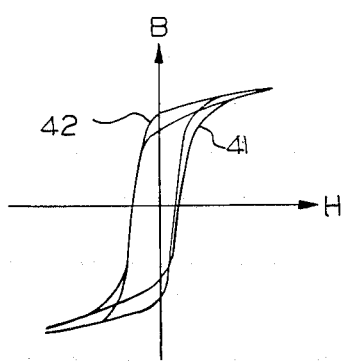
FIG. 7 shows a graph of hysteresis characteristics of an underlying film of a flexible magnetic recording medium according to a first embodiment of this invention.
Figure 8:
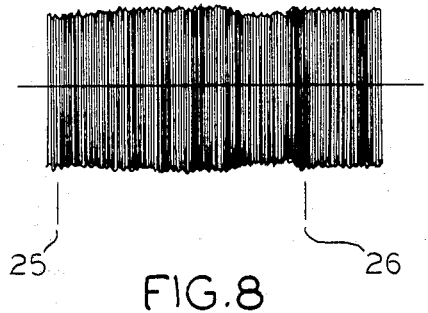
FIG. 8 shows a reproduced signal read out of a flexible disk made of the flexible magnetic recording medium of the first embodiment when a signal of a constant voltage amplitude is recorded into the flexible disk.

Referring to FIGS. 7 and 8, a flexible magnetic recording medium according to a first embodiment of this invention comprises a first film 11 comprising 10% by weight of copper and the balance of a high magnetic permeability material. The high magnetic permeability material may be Permalloy comprising, by weight, 79% of nickel, 17% of iron, and 4% of molybdenum. It is apparent from FIG. 4 that the first film 11 has saturation magnetization of about 500 e.m.u./cc. In FIG. 7, a characteristic curve 41 is illustrative of a B-H characteristic of the first film 11 in a lengthwise direction of the substrate 10 while another characteristic curve 42 is illustrative of a B-H characteristic of the first film 11 in a widthwise direction of the substrate 10. The curve 41 forms a rectangular hysteresis loop. The curve 42 also forms another rectangular hysteresis loop. Both of the hysteresis loops are almost superposed on each other, as illustrated in FIG. 7. This means that the first film 11 almost exhibits magnetic isotropy.

In FIG. 8, a reproduced signal is measured about the flexible disk made of the flexible magnetic recording medium according to the first embodiment of this invention in a manner described in conjunction with FIGS. 3 and 6. As shown in FIG. 8, fluctuation of the reproduced signal is considerably reduced and the resultant reproduced signal has a constant amplitude around all circumference of the flexible disk. As a result, it is possible to accurately record digital information by the use of the flexible disk.

As mentioned before, the first film 11 comprises Permalloy of an alloy of nickel and iron and a magnetization adjusting component. The Permalloy comprises 82.3% by weight of nickel and the balance of iron. The magnetization adjusting component is adjusted in amount so that the first film 11 has saturation magnetization less than or equal to 500 e.m.u./cc. The magnetization adjusting component consists essentially of a combination of molybdenum and copper and is 13.6% by weight of the first film 11.

A flexible magnetic recording medium according to a second embodiment of this invention will now be described. A first film 11 comprises a different type of Permalloy comprising 82% by weight of nickel and 18% by weight of iron. The first film 11 further comprises molybdenum in addition to Permalloy. Let a composition of the first film 11 be given by weight as $(Ni_{0.82}.Fe_{0.18})_{100-x}.(Mo)_x$. When x is less than 12, saturation magnetization of the first film 11 is greater than 500 e.m.u./cc. It is to be noted here that a high permeability characteristic of the Permalloy disappears by an addition of molybdenum when x is greater than 50. It is therefore possible to make use of 12-50% by weight of molybdenum as a magnetization adjusting component of the first film 11. That is to say, the magnetization adjusting component may consist essentially of molybdenum between 12 and 50% by weight of the first film 11. When the flexible magnetic recording medium is cut into a flexible disk as described above, fluctuation of a reproduced signal which occurs due to magnetic anisotropy of the first film 11 can completely be removed to the extent of the flexible disk illustrated in conjunction with FIGS. 7 and 8. It is therefore possible to accurately record digital information by the use of the flexible disk.

A flexible magnetic recording medium according to a third embodiment of this invention will now be described. A first film 11 of the flexible magnetic recording medium comprises Permalloy of 82% by weight of nickel and 18% by weight of iron like in the flexible magnetic recording medium according to the second embodiment of this invention. The first film 11 further comprises an additive of molybdenum and copper as the magnetization adjusting component besides the Permalloy. When the additive is not smaller than 12% by weight in the first film 11, saturation magnetization of the first film 11 can be restricted to a range which is less than or equal to 500 e.m.u./cc regardless of a ratio of molybdenum to copper. However, a high permeability of the Permalloy is degraded by 50% by weight of the additive. Therefore, the additive may be between 12 and 50%. That is, the magnetization adjusting component is a combination of molybdenum and copper and is between 12 and 50% by weight. When a flexible disk is manufactured by cutting the flexible magnetic recording medium, fluctuation of a reproduced signal can be reduced like in the first and the second embodiments of this invention. Accurate record of digital information can therefore be achieved by the use of the flexible disk.

As is described heretobefore, there is provided a flexible magnetic recording medium which comprises a first film 11 having reduced in-plane magnetic anisotropy in accordance with this invention. The reduced in-plane magnetic anisotropy is accomplished by reducing saturation magnetization of the first film 11 to a range which is less than or equal to 500 e.m.u./cc by adding the magnetization adjusting component to the alloy of nickel and iron. The magnetization adjusting component may be at least one element selected from a group consisting of nonmagnetic materials, such as titanium or silicon. The alloy may comprise 70-90% by weight of nickel and the balance of iron. An alloy less than 70% by weight of nickel can not be used as the first film 11 because of high magnetostriction of the alloy.

While this invention has thus far been described in conjunction with a few embodiments thereof, it will be readily possible for those skilled in the art to put the invention into practice in various other manners. For example, various nonmagnetic films, such as a polyimide film, may be used instead of the polyester film as the substrate 10. In addition, the first film 11 may be formed by various other methods, such as vacuum evaporation or ion-plating.

What is claimed is:

1. In a magnetic recording medium comprising a substrate having a principal surface, a first film formed on said principal surface, and a second film which is formed on said first film and which has magnetic anisotropy perpendicular to said principal surface so that said second film is magnetizable perpendicular to said principal surface, said first film comprising an alloy of nickel and iron and having high magnetic permeability, said first film having magnetic anisotropy parallel to said principal surface, the improvement wherein said first film further comprises a magnetization adjusting element in an amount effective to adjust the saturation magnetization of the alloy to a value less than or equal to 500 e.m.u./cc.

2. A magnetic recording medium as claimed in claim 1, wherein said magnetization adjusting element is 12-50% by weight of said first film and consists essentially of molybdenum.

3. A magnetic recording medium as claimed in claim 1, wherein said magnetization adjusting element is 12-50% by weight of said first film and consists essentially of a combination of molybdenum and copper.

4. A magnetic recording medium as claimed in claim 1, wherein said substrate is polyester.

5. A magnetic recording medium as claimed in claim 1, wherein said alloy is an alloy of 70-90% by weight of nickel and the balance of iron.

* * * * *